US005468911A

United States Patent [19]

Leve et al.

[11] Patent Number: 5,468,911

[45] Date of Patent: Nov. 21, 1995

[54] SCREENING HULL FOR ELECTRICAL CABLE

[75] Inventors: Ludger Leve, Erkrath; Jurgen Sieroks, Haan, both of Germany

[73] Assignee: Framatome Connectors International, Courbevoie, France

[21] Appl. No.: 106,988

[22] Filed: Aug. 16, 1993

[30] Foreign Application Priority Data

Aug. 14, 1992 [DE] Germany ........................ 42 26 904.0

[51] Int. Cl.[6] ........................ H02G 15/02; H02G 15/08; H02G 15/064; H01R 4/10

[52] U.S. Cl. .................. 174/74 R; 174/75 C; 174/35 C; 174/73.1; 439/877; 439/867; 439/125

[58] Field of Search .................................. 174/74 R, 19, 174/82, 74 A, 89, 93, 73.1, 60, 35 C, 75 C; 439/125, 127, 128, 867, 877

[56] References Cited

U.S. PATENT DOCUMENTS

| | | | |
|---|---|---|---|
| 1,175,343 | 3/1916 | Conrad . | |
| 2,536,003 | 12/1950 | Dupre | 174/88 |
| 2,777,894 | 1/1957 | Arbeiter . | |
| 2,890,267 | 6/1959 | Forney | 174/88 |
| 2,929,862 | 3/1960 | Aune | 174/75 |
| 2,954,420 | 9/1960 | Logan | 174/75 |
| 3,097,033 | 7/1963 | Felts . | |
| 3,141,924 | 7/1964 | Forney | 174/75 |
| 3,406,373 | 10/1968 | Forney . | |
| 4,280,749 | 7/1981 | Hemmer | 339/177 R |
| 4,553,806 | 11/1985 | Forney, Jr. et al. | 339/94 C |
| 4,719,315 | 1/1988 | Gregorac | 174/73 R |
| 4,799,902 | 1/1989 | Laudig | 439/585 |
| 5,154,635 | 10/1992 | Kaufman | 439/578 |

FOREIGN PATENT DOCUMENTS

| | | | |
|---|---|---|---|
| 52980 | 6/1982 | European Pat. Off. | 439/585 |
| 1300611 | 6/1962 | France | 439/578 |
| 1081534 | 5/1960 | Germany . | |
| 1156467 | 10/1963 | Germany . | |
| 2427189 | 6/1973 | Germany | 439/585 |
| 3306436 | 8/1984 | Germany | 439/585 |
| 1590319 | 5/1981 | United Kingdom | 439/585 |

*Primary Examiner*—Leo P. Picard
*Assistant Examiner*—Stephen T. Ryan
*Attorney, Agent, or Firm*—Pollock, Vande Sande & Priddy

[57] ABSTRACT

Crimp hull for an electrical cable with a peripheral screening against external electrical and/or magnetic influences, where the crimp hull comprises two pieces and has an outer collar to connect the cable screening to the ground connection.

5 Claims, 3 Drawing Sheets

SCREENING HULL FOR ELECTRICAL CABLE

FIELD OF THE INVENTION

The invention relates to a screening hull (hereinafter referred to as crimp hull) for electrical cables with a peripheral screening against external electrical and/or magnetic interferences and to make electrical contact for potential equalization.

Such cables are used for example, in motors, where they are attached to so-called rotary encoders. Cables and rotary encoders are connected together by means of suitable connectors, which are positioned at the free end of the cable. In so doing, it is important to fasten the cable securely in order to assure reliable positioning of the connector and to minimize tension stresses on the contacts of the connector.

BACKGROUND OF THE INVENTION

It well known to provide the free end of the cable sheath (protruding beyond the cable strands for attachment to the connector) with a conical ring, which tapers conically towards the free end, the screening extending coaxially to the cable strands being bent around the outside of the conical ring. The conical ring is then guided against a corresponding cone to a housing, which also receives the connector, and finally the cable is secured against axial motion by means of a screw/flange connection.

This type of attachment of the cable to a housing is complicated and time-consuming.

SUMMARY OF THE INVENTION

The object of the invention is to provide a simplified arrangement for fastening an electrical cable with a peripheral screening to a suitable housing, the screening being electrically connected to the housing (to the mass).

The object is achieved with a two-piece crimp hull whose outer hull comprises collar which snaps into the housing.

Thus, the invention relates to a crimp hull of the aforementioned kind with the following features:

(1) a first, inner hull that can be slid on the cable sheath, and (2) a second, outer hull which can be slid coaxially with play over the inner hull and which comprises a deformable collar that projects radially outwardly, (3) the distance between the inner and outer hulls being so dimensioned that the free end of the cable screening, which is folded back from the end of the cable over the first hull, can be received between the two hulls and both hulls can be fastened relative to the cable by means of a crimping operation.

In other words: below the insulated (free) end of the cable, where the cable strands protrude freely beyond the cable sheath, a first, normally cylindrical hull is slid onto the cable sheath. The free end of the screening that protrudes beyond the hull (in the direction of the free end of the cable) is then bent (slid over the first hull), so that it covers the first hull on the outside. The second, outer hull is then slid onto the first, inner hull and the screening arranged thereon, so that at this stage the screening is located between the outer and inner hulls. The dimensions of the hulls are preferably so chosen that, by way of static friction, a certain amount of fastening of the hulls on the cable sheath is assured preferably with respect to the screening located therebetween.

This process is followed by a crimping operation, in which the hulls are deformed jointly and thereby are fastened in place with respect to the cable (cable sheath).

The inner hull performs a "support function". Without it, the deformability of the cable (cable sheath) would normally be inadequate to ensure reliable fastening relative to the cable during crimping of the (outer) hull. Only in the case of very stiff cables (outer sheath) could the inner hull optionally be omitted.

At the same time, by means of the described arrangement, an electrical connection between the screening and the outer hull is produced that is now fastened by means of its radially outwardly projecting collar, in a corresponding snap-in groove of the housing.

For this purpose, the housing is provided with a suitable undercut, into which the radial free end of the collar snaps.

Screw connections, which are required for prior art constructions, are not needed.

The collar can be designed in different ways. Both for production reasons and to simplify locking, the collar is arranged according to one embodiment, on the free end of the outer hull.

In so doing, it can be disposed exactly radially (i.e., at an angle of 90°) with respect to the hull body. According to one embodiment, however, the collar is flanged in the direction of the outer hull (thus bent back), so that the cross section of the collar is essentially U shaped, a feature that will be explained in detail below relative to the following embodiments.

To simplify the deformation of the outer hull during the locking operation, the collar must also have radially extending notches which are open on the outside, so that the collar may be said to consist of a plurality of radially projecting, springy "flaps".

These "flaps", especially if they are evenly distributed over the circumference of the hull enable, a constant, low insertion force and simultaneously provide a large area contact region relative to the housing and thus a large area, reliable ground contact for the screening clamped between the outer and inner hulls.

In this manner, interferences like those occurring in the field of application for a rotary encoder for a motor are optimally diverted.

The inner hull can be made of diverse materials, e.g., plastic or metal. A metal hull is preferred, because it can be deformed especially well in the crimping operation. The outer hull must to be made of an electrically conducting material in order to ensure the desired ground connection between the screening and the housing. Here, a metal hull is recommendable.

BRIEF DESCRIPTION OF THE DRAWING

The invention will now be described with reference to the attached drawings.

DESCRIPTION OF PREFERRED EMBODIMENT

Figure 1:
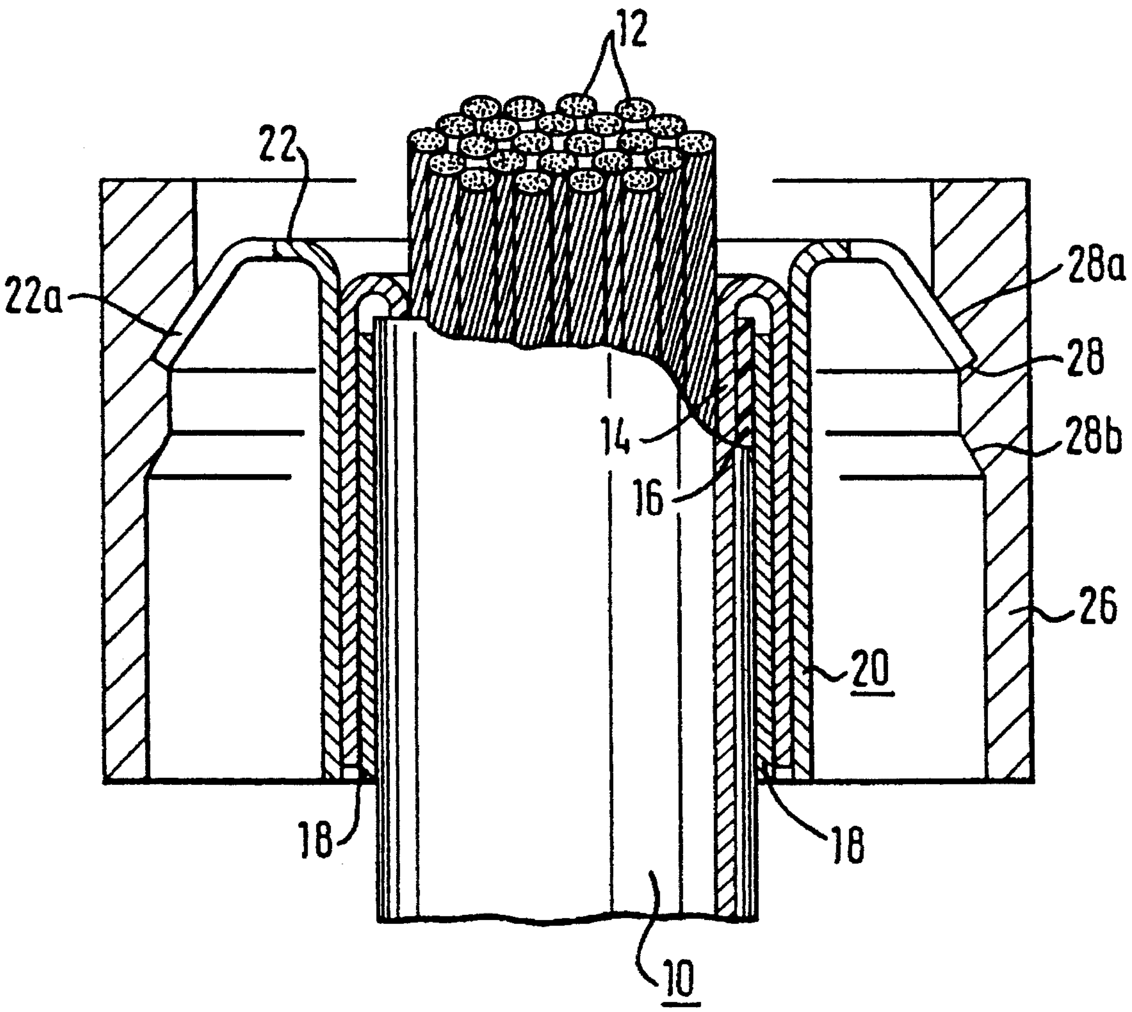
FIG. 1 is a sectional view of a crimping hull according to the invention that is crimped on a cable and snapped into a housing of a rotary encoder for a motor.

FIG. 1 shows a cable 10, which consists of a plurality of cable strands 12 enclosed by a metal screening 14 and assembled into a cable sheath 16.

The upper free end of the cable sheath 16 is cut away.

A first, inner metal hull 18, which envelops the cable sheath 16, is slid onto the prepared cable 10, producing static friction between them. The end of the screening 14 that projects freely toward the top is subsequently bent downwardly around the inner hull 18, so that this free end of the screening 14 is positioned on the outer circumferential surface of the inner hull 18.

Figure 2:
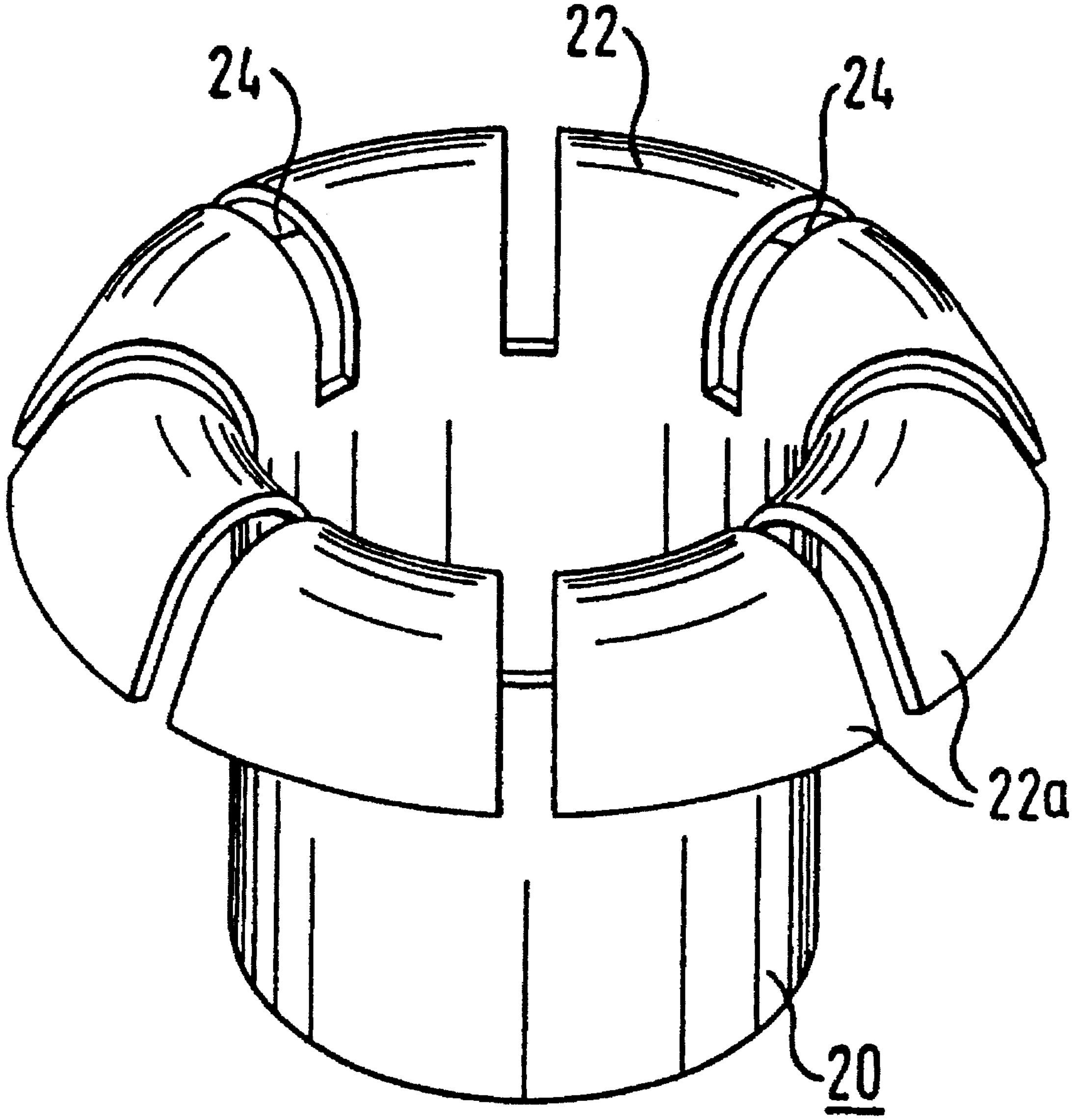
FIG. 2 is a perspective view of the outer hull according to FIG. 1.

A outer hull 20, whose geometric shape is shown in FIG. 2 and will be described in detail hereinbelow, was slid over the free end of the cable 10, thus resulting in the configuration shown in FIG. 1. The inner hull 18, the free end of the screening 14 and the outer hull 20 now extend coaxially to each other, and the screening 14 lies between the hulls 18, 20 under static friction.

The upper free end of outer hull 20 in FIG. 1 has an outer, flanged collar 22, which, as shown in FIG. 2, comprises radially extending notches 24, delimiting eight radially extending flaps **22*a* within the collar 22**.

It follows from FIG. 1 that the collar, seen in a sectional view, has an inverted U shape.

Figure 3:
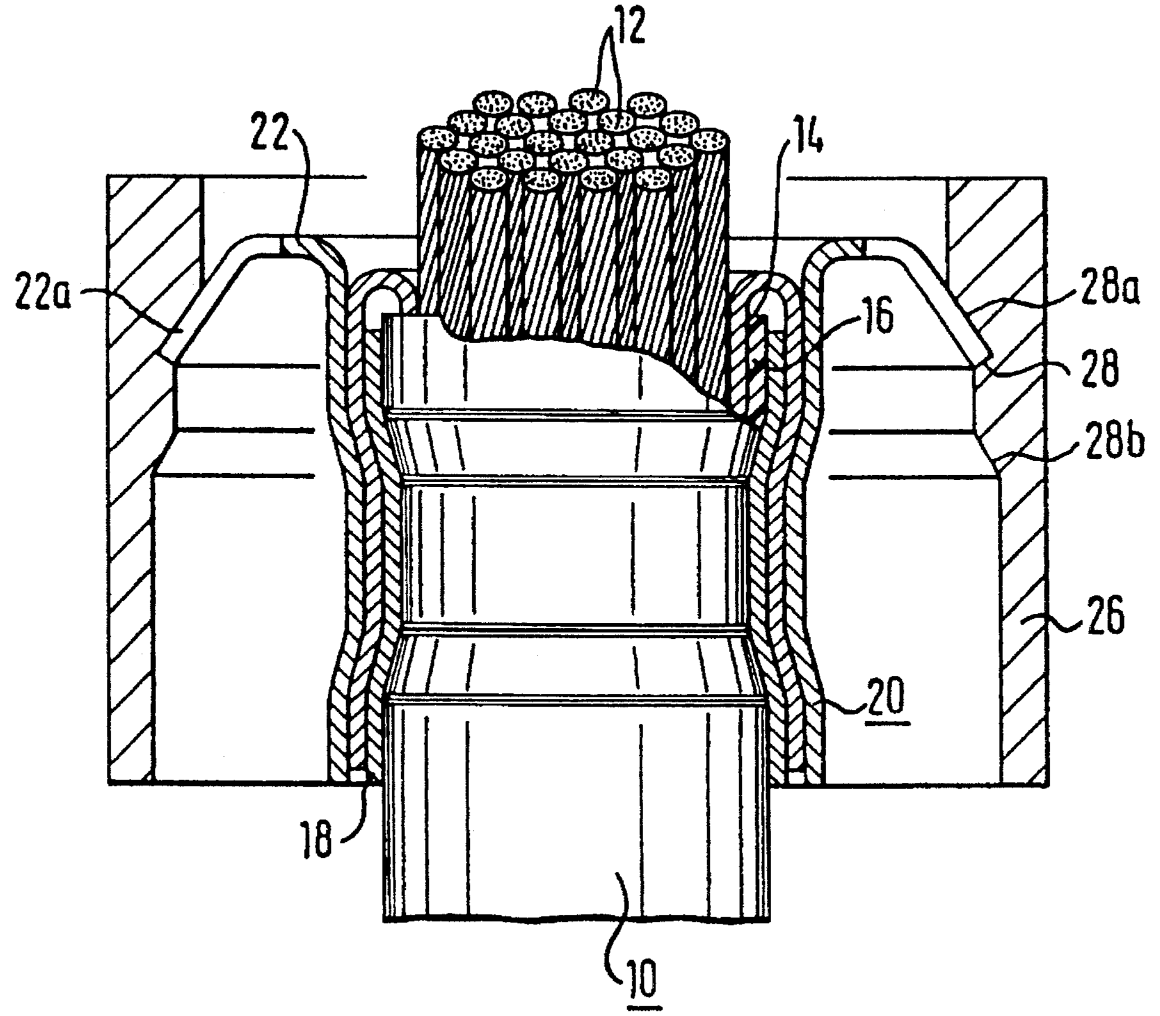
FIG. 3 depicts the arrangement according to FIG. 1 in the crimped state.

FIG. 3 shows the crimp hull, formed by hulls 18, 20, after crimping, i.e., after fastening by clamping relative to the cable 10. Thus the connection between the crimp hull and the cable 10 is stationary.

After crimping, the cable designed with the crimp hull is now pushed into a housing 26, which has an interior circumferential annular groove 28 with an undercut segment and a surface section **28*a*** sloped inwardly relative to the undercut segment.

When the crimp hull is pushed forward, the flaps **22*a* are pushed inwardly upon reaching the housing projection 28*b*, and upon reaching the annular groove 28 the flaps 22 snap outwardly into the annular groove 28 due to their deformability, and simultaneously abut against the flange segment 28*a*, thereby producing a large surface ground connection from the screening 14 by way of the outer hull 20 to the housing 26**.

At the same time, the cable with the crimped hull snaps tightly into the housing 26. No further fastening measures are necessary.

The cable 10, or the cable strands 12, are then attached to a plug connector. Depending on the field of application, attachment to other components or devices is possible.

The two-piece crimp hull according to the invention is not only built in a simple manner but also enables rational and reliable fastening of the related cable 10 to the housing 26, while simultaneously ensuring optimal ground connection between screening 14 and housing 26.

What is claimed is:

1. Fastening means for an electrical cable, comprising a screening hull with peripheral screening against external electrical and/or magnetic interferences, said screening hull comprising:

(a) an inner hull (18) adapted to be slid on a cable sheath (16); and (b) an outer hull (20) adapted to be slid coaxially with play over said inner hull (18) and having a radially outwardly projecting deformable collar (22);

(c) said inner and outer hulls (18,20) being separated by a distance such that a free end of cable screening (14), which is folded back from an end of said cable over said inner hull (18), can be received between said inner and outer hulls, and that said inner and outer hulls (18, 20) can be fastened relative to the cable (10) by means of a crimping operation;

(d) said collar (22) being flanged in the direction of the outer hull (20), so that a cross section of said collar is substantially U-shaped.

2. Fastening means according to claim 12, wherein said collar (22) is disposed on a free end of said outer hull (20).

3. Fastening means according to claim 1, wherein at least said outer hull (20) is made of metal.

4. Fastening means according to claim 1, wherein said collar (22) is adapted to snap into an annular groove (28) on an inner surface of a housing (26) and produces electrical contact between said housing, said outer hull and said cable screening.

5. Fastening means for an electrical cable (10), comprising a screening hull with peripheral screening (14) against external electrical and/or magnetic interferences, said screening hull comprising:

(a) an inner hull (18) adapted to be slid on a cable sheath (16); and (b) an outer hull (20) adapted to be slid coaxially with play over said inner hull (18) and having a radially outwardly projecting deformable collar (22);

(c) said inner and outer hulls (18, 20) being separated by a distance such that a free end of said cable screening (14), when folded back from an end of said cable over said inner hull (18), can be received between said inner and outer hulls, and that said inner and outer hulls (18, 20) can be fastened relative to said cable (10) by means of a crimping operation;

(d) wherein said collar (22) comprises notches (24) which extend radially and are open toward the outside.

* * * * *